United States Patent Office 3,039,875
Patented June 19, 1962

3,039,875
ANIMAL FEEDSTUFF SUPPLEMENTED WITH 5-NITRO-2-FURALDEHYDE 2-(3-HYDROXYETH-YL)-SEMICARBAZONE
Mary F. Paul, Norwich, N.Y., assignor to The Norwich Pharmacal Company, Norwich, N.Y., a corporation of New York
No Drawing. Filed May 2, 1958, Ser. No. 732,466
4 Claims. (Cl. 99—2)

This invention relates to animal feeds and aims to provide a supplemented animal feedstuff containing an effective growth-stimulating and feed conversion factor.

In the practice of animal husbandry, attempts have been made in the past to attain greater weight and better appearance of stock, and at the same time reduce feeding costs, by resorting to supplemented rations. Various substances have been utilized as additives to basal rations to accomplish this and to advance the science of animal husbandry. However, not all additives are free from such disadvantages in use as (1) possibility for retention in tissue which poses a problem when such tissue is of the edible variety; (2) stability in mixing and storage; (3) effect upon egg production and hatchability in poultry species; (4) injudicious administration forestalling later therapeutic indication by virtue of the emergence of resistant mutants; and (5) establishment of dosage tolerances because of unpredictable and unwanted side effects.

I have discovered that it is possible to achieve remarkable and surprising stimulation of growth, general improvement in health and appearance and enhanced feed efficiency in animals, while avoiding the disadvantages enumerated above which have attended the use of past additives, through the administration of a supplemented animal feedstuff containing, in addition to the animal's basal ration, a small quantity of 5-nitro-2-furaldehyde 2-(2-hydroxyethyl)semicarbazone. In the practice of my invention, an animal feed serves as a carrier for a small quantity of 5-nitro-2-furaldehyde 2-(2-hydroxyethyl)semicarbazone which is admixed therewith. Its preparation may be readily accomplished through any of the common methods employed for dispersing supplementary agents uniformly in feed such as tumbling, grinding and stirring.

The amount of 5-nitro-2-furaldehyde 2-(2-hydroxyethyl)semicarbazone added to the basal diet may be varied within limits. It is usually sufficient to add an amount within the range of about 10–100 mg. per kilogram of ration to achieve optimum results. Within this range I prefer the level of about 20–50 mg. per kilogram of ration for, when used as a feedstuff, it exhibits the optimal features of my invention. I have found the 50 mg. per kilogram level to be particularly operable in certain species, e.g. swine, while a level of about 20 mg. per kilogram is desirable in others, e.g. chickens.

In the course of experiments commonly termed "screening procedures," I have found my compositions to demonstrate extremely salutary effects when administered to animals. In such experiments, groups of healthy, weanling albino rats, housed under exemplary conditions and provided with feed and water ad libitum, were among the subjects. To some of those groups a basal feed suitable for the production of weight gain was offered and to others such basal feed, having a quantity of 5-nitro-2-furaldehyde 2-(2-hydroxyethyl)semicarbazone in the amount of 50 mg. per kilogram uniformly dispersed therethrough, was provided. Feeding of that ration was carried out over a period of four weeks with other groups receiving the basal diet being observed for the same time period. The basal diet consisted of:

| | Parts by weight |
|---|---|
| Casein | 90 |
| Sucrose | 702 |
| "Alphocel" (commercially available α-cellulose product) | 40 |
| Cottonseed oil | 24 |
| Corn oil | 56 |
| Salt mixture | 40 |
| D,l-methionine | 3 |
| Sucrose-vitamin mixture [1] | 40 |
| Liver extract | 5 |

[1] This mixture was prepared so as to contain 4 grams of vitamin and other dietary essentials per kilogram of diet as follows: 125 mg. vitamin $B_1$; 125 mg. vitamin $B_6$; 250 mg. riboflavin; 250 mg. niacin; 1250 mg. calcium pantothenate; 2500 mg. p-aminobenzoic acid; 7500 mg. i-inositol; 75,000 mg. choline chloride; 5 mg. folic acid; 62.5 mg. menadione; 7500 mg. mixed tocopherols; 12,500 mg. oleum percomorphum; 1845 mg. 0.1% vitamin $B_{12}$; 0.025 mg. biotin and 981 g. sucrose.

The data obtained from such experiments is presented in Table I. It illustrates the improvement in weight gain and enhanced feed efficiency realized in the groups receiving a basal diet having incorporated therewith a small quantity of 5-nitro-2-furaldehyde 2-(2-hydroxyethyl)semicarbazone.

TABLE I

| Expt. No. | Group | No. per Group | Ave. Starting Weight in Gms. | Ave. Weight in Gms. at 28 days | Ave. Gain In Gms. | Feed Efficiency |
|---|---|---|---|---|---|---|
| A | Control | 10 | 73 | 164 | 91 | 4.4 |
|   | Treated | 10 | 73 | 182 | 109 | 3.7 |
| B | Control | 10 | 61 | 121 | 60 | 6.1 |
|   | Treated | 10 | 61 | 158 | 97 | 3.9 |
| C | Control | 10 | 61 | 151 | 90 | 3.7 |
|   | Treated | 10 | 61 | 161 | 100 | 3.4 |
| D | Control | 10 | 51 | 140 | 89 | 3.5 |
|   | Treated | 10 | 52 | 156 | 104 | 3.3 |

Other animal species also respond remarkably well when offered my compositions. For instance, tests upon chickens demonstrated a surprising weight gain and feed conversion in that species. In these tests day-old chickens of known heredity were employed. An adequate basal ration having this composition was used.

*Basal Ration*

| Ingredient: | Parts by weight |
|---|---|
| Ground yellow corn | 45.38 |
| Soybean oil meal (44% protein) | 38.00 |
| Animal fat (stabilized) | 5.00 |
| Steamed bonemeal | 2.50 |
| Limestone | 1.00 |
| Alfalfa meal (17% protein) | 2.00 |
| Dried whey | 2.50 |
| Fish solubles | 2.50 |
| Manganese sulfate (feed grade) | 0.05 |
| Iodized salt | 0.50 |
| Methionine (98%) | 0.15 |
| Choline (25%) | 0.25 |
| Vitamin $B_{12}$ (20 mg./lb.) | 0.0125 |
| Vitamin supplement: 2 gm. riboflavin, 4 gm. pantothenic acid and 9 gm. niacin per pound | 0.10 |
| Dry vitamin $D_3$ (3000 units/gm.) | 0.011 |
| Dry vitamin A (10,000 units/gm.) | 0.05 |
| | 100.0035 |

TEST I

The chickens used in this test were housed in floor pens provided with a clean litter of crushed cobs. Feed and water were offered ad libitum. Groups of 50 broiler chickens were segregated to afford a control group receiving the basal diet for comparison with other groups to which the basal diet containing varied amounts of the compound, 5-nitro-2-furaldehyde 2-(2-hydroxyethyl)semicarbazone, was offered and to permit comparison of the effects produced by varied amounts of that compound. Each group received in its ration nitrofurazone in the amount of 0.0055%. The results of such a test, representing a total of 150 birds for each group maintained in the test for 63 days, are shown in the following table:

TABLE II

| Group | Amount of Compound (gm./ton) | Average Weight (gms.) | | | Feed Efficiency Gm. feed/Gm. Gain in Wt. |
|---|---|---|---|---|---|
| | | Male | Female | Ave. | |
| Basal | | 1,396 | 1,089 | 1,243 | 2.71 |
| Basal + Compound | 5 | 1,397 | 1,187 | 1,292 | 2.60 |
| Do | 10 | 1,441 | 1,225 | 1,333 | 2.59 |
| Do | 15 | 1,443 | 1,185 | 1,314 | 2.60 |
| Do | 20 | 1,468 | 1,181 | 1,325 | 2.56 |

TEST II

This test was conducted in the same manner as Test I except that the feed offered to the groups did not contain nitrofurazone. The results are shown in Table III:

TABLE III

| Group | Amount of Compound (gm./ton) | Average Weight (gms.) | Feed Efficiency (Gm. feed/Gm. Gain in Weight) |
|---|---|---|---|
| Basal | | 1,341 | 2.86 |
| Basal + Compound | 10 | 1,381 | 2.78 |
| Do | 25 | 1,393 | 2.77 |

Still another species that responds favorably to my feed compositions in swine. When a conventional cold ground basal ration of corn, barley, soy bean oil meal, meat scraps, alfalfa, mineral mix and vitamin mix, and containing, as additive, 50 gm. per ton of 5-nitro-2-furaldehyde 2-(2-hydroxyethyl)semicarbazone, was fed to swine over a period of 90 days, notable weight gain of the order of 5-6% over that found in a control group was produced with no evidence of toxicity and with complete palatability.

The basal rations which have been described above are merely illustrative and it is to be understood that the term "basal ration" used in the following claims (wherein the parts are by weight) is intended to include such feedstuff mixtures as are conventionally fed to animals in the normal practice of animal husbandry.

What I claim is:

1. A supplemented animal feedstuff containing a growth-promoting factor consisting of from about 1 to about 10 parts of 5-nitro-2-furaldehyde 2-(2-hydroxyethyl)semicarbazone and 100,000 parts of a carrier therefor comprising basal ration.

2. A supplemented animal feedstuff containing a growth-promoting factor consisting of from about 2 to about 5 parts of nitro-2-furaldehyde 2-(2-hydroxyethyl)semicarbazone and 100,000 parts of a carrier therefor comprising basal ration.

3. A supplemented animal feedstuff containing a growth-promoting factor consisting of about 1 part of 5-nitro-2-furaldehyde 2-(2-hydroxyethyl)semicarbazone and 20,000 parts of a carrier therefor comprising basal ration.

4. A supplemented animal feedstuff containing a growth-promoting factor consisting of about 1 part of 5-nitro-2-furaldehyde 2-(2-hydroxyethyl)semicarbazone and 50,000 parts of a carrier therefor comprising basal ration.

References Cited in the file of this patent

UNITED STATES PATENTS

| 2,416,235 | Stillman | Feb. 18, 1947 |
| 2,812,282 | Ells | Nov. 5, 1957 |
| 2,856,328 | Terry | Oct. 14, 1958 |

OTHER REFERENCES

Berg et al: Poultry Science, September 1955, p. 1180.

UNITED STATES PATENT OFFICE

CERTIFICATE OF CORRECTION

Patent No. 3,039,875                        June 19, 1962

Mary F. Paul

It is hereby certified that error appears in the above numbered patent requiring correction and that the said Letters Patent should read as corrected below.

Column 1, lines 3 and 4, for that portion of the title reading "2-(3-HYDROXYETHYL)-SEMICARBAZONE" read -- 2-(2-HYDROXYETHYL) SEMICARBAZONE --; column 4, list of references cited, under the heading "UNITED STATES PATENTS" add the following:

2,416,234 Stillman---------Feb. 18, 1947

Signed and sealed this 2nd day of October 1962.

(SEAL)
Attest:

ERNEST W. SWIDER                          DAVID L. LADD
Attesting Officer                             Commissioner of Patents